United States Patent [19]
Christensen et al.

[11] Patent Number: 5,881,230
[45] Date of Patent: Mar. 9, 1999

[54] METHOD AND SYSTEM FOR REMOTE AUTOMATION OF OBJECT ORIENTED APPLICATIONS

[75] Inventors: Erik B. Christensen; Bradford H. Lovering, both of Seattle, Wash.

[73] Assignee: Microsoft Corporation, Redmond, Wash.

[21] Appl. No.: 679,224

[22] Filed: Jun. 24, 1996

[51] Int. Cl.$^6$ .................................................. G06F 13/00
[52] U.S. Cl. .............................. 395/200.33; 395/200.47; 395/200.49
[58] Field of Search ........................... 395/200.33, 200.3, 395/200.47, 200.48, 200.49, 683, 684

[56] References Cited

U.S. PATENT DOCUMENTS

| | | | |
|---|---|---|---|
| 5,687,331 | 11/1997 | Vilk et al. | 345/327 |
| 5,689,664 | 11/1997 | Narayanan et al. | 345/340 |
| 5,692,157 | 11/1997 | Williams | 395/500 |
| 5,729,745 | 3/1998 | Reina et al. | 395/683 |
| 5,740,439 | 4/1998 | Atkinson et al. | 395/701 |
| 5,748,188 | 5/1998 | Hu et al. | 345/326 |
| 5,752,027 | 5/1998 | Familiar et al. | 395/677 |
| 5,761,684 | 6/1998 | Gibson | 707/515 |
| 5,764,908 | 6/1998 | Shoji et al. | 395/200.47 |

OTHER PUBLICATIONS

Leach, "Microsoft to extend OLE architecture with OCX96," PC Week, p. 9 (Jan. 22, 1996).
Leach, "OMG calls on Microsoft to share net OLE data," PC Week, p. 10 (Jan. 22, 1996).
Leach, "NeXT, Willows craft technology options," PC Week, pp. 27–28 (Jan. 22, 1996).
Pompeii, "Distributed Objects and the Internet," Dr. Dobb's Journal, pp. 70–76 (Mar. 1996).
Orfali and Harkey, "The Server Side of CORBA," OS/2 Developer, pp. 26–30 (Jul./Aug. 1995).
Orfali et al., "Intergalactic Client/Server Computing," BYTE, pp. 108–122 (Apr. 1995).
Orfali and Harkey, "Client/Server with Distributed Objects," BYTE, pp. 151–162 (Apr. 1995).
Orfali et al., "OLE vs OpenDoc: Are All Parts JUST Parts?", Datamation, pp. 38–46 (Nov. 15, 1994).
Reeves et al., "A Distributed Object Road Map for Developers," OS/2 Developer, pp. 31–53 (Sep./Oct. 1994).
Orfali and Harkey, "Client/Server Programming with CORBA Objects," OS/2 Developer, pp. 46–53 (Sep./Oct. 1994).
Orfali et al., *The Essential Distributed Objects Survival Guide,* John Wiley & Sons, Inc. (1996).

*Primary Examiner*—Zarni Maung
*Attorney, Agent, or Firm*—Klarquist Sparkman Campbell Leigh & Whinston

[57] ABSTRACT

An object oriented programming environment is extended to allow a client object oriented application running under a client/server operating system to communicate with a plurality of server object oriented applications located on one or more remote computers in a distributed computer environment. The extended object oriented programming environment provides the capability for a client object oriented application to connect to, and communicate with remote server object oriented applications as well as make object references to remote objects and remote object data. The extended object oriented programming environment is used for designing N-tiered logical models for distributed computing applications, while providing a flexible and adaptable M-tiered physical model underneath the N-tiered logical model. This environment is also used to provide the ability to reference remote objects from Internet and other client network applications.

19 Claims, 8 Drawing Sheets

PRIOR ART ILLUSTRATION

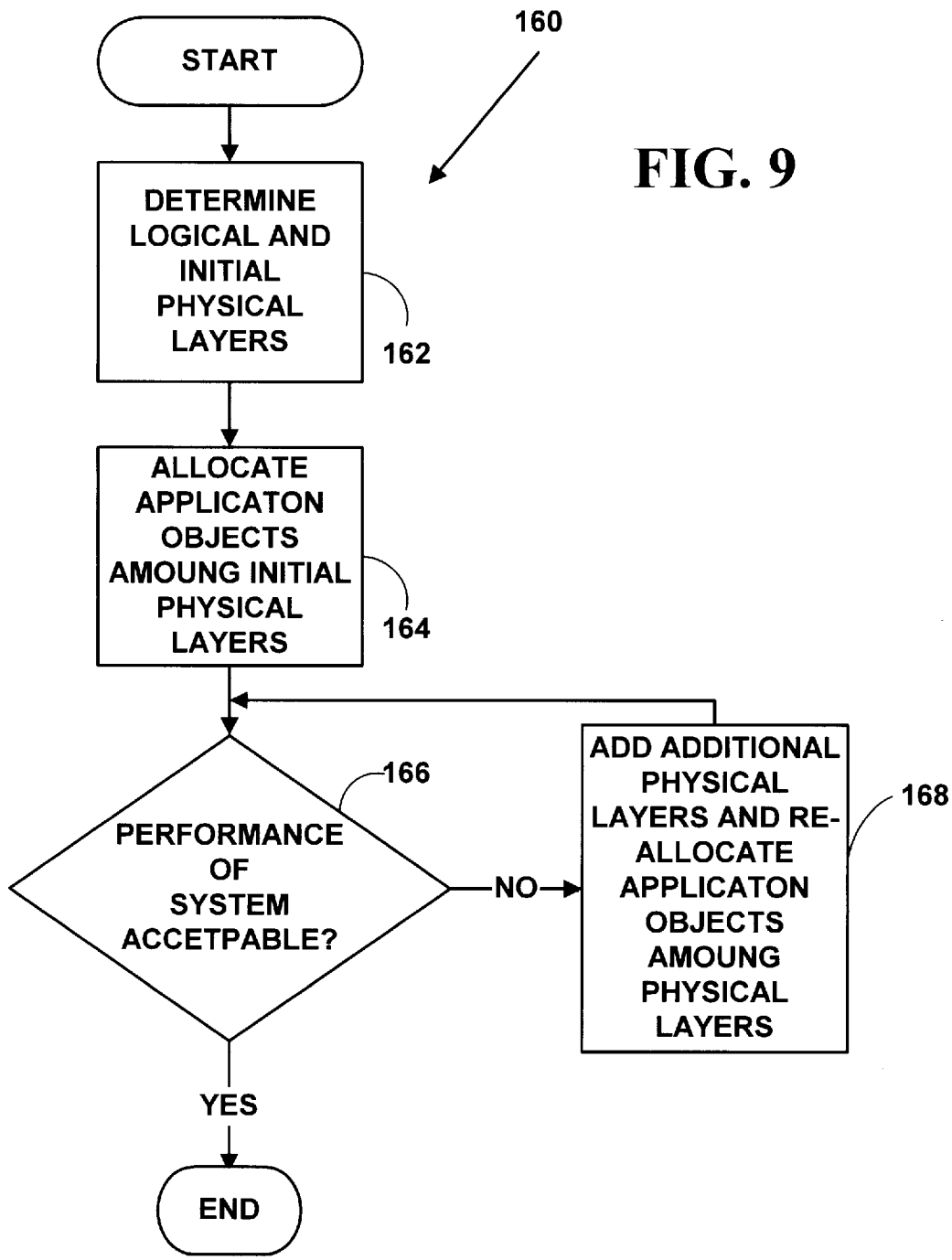

METHOD AND SYSTEM FOR REMOTE AUTOMATION OF OBJECT ORIENTED APPLICATIONS

FIELD OF INVENTION

The present invention relates to communications between client/server object oriented applications. More particularly it relates to the communication of object oriented information between a client object oriented application and a server object oriented application running on a remote computer in a distributed computing environment.

BACKGROUND AND SUMMARY OF THE INVENTION

Object oriented programming, as is well known in the art, is used to design computer software that is easy to create, cost effective to modify, and reusable. Object oriented software provides data abstraction, which hides the physical representation of data within objects, and thus lessens the impact of changes when modifications are made to the software.

The Component Object Model (COM) for object oriented programming specifies how objects within a single application or between applications (e.g. client/server applications) interact and communicate by defining a set of standard interfaces. Interfaces are groupings of semantically related functions through which a client application accesses the services of a server application.

Object Linking and Embedding (OLE), such as OLE Version 2 by Microsoft Corporation of Redmond, Wash., is based in part on the Component Object Model and allows the creation of objects of different formats which operate on object data through defined interfaces, rather than on the applications responsible for the data. Using OLE, object data can be embedded within an object, or linked to it, so that only a reference to the object data is stored in the object. OLE enables developers to create sophisticated and extensible client/server applications.

At the heart of the OLE object system is the ability for a client object oriented application to have a reference to an object in a server object application, even though the two applications are not sharing computer process memory (e.g., computer memory, in the same operating system process space). In many client/server systems, both the client and server application exist within the same operating system process, and thus are able to share process memory. To allow an out-of-shared memory reference, two additional objects are created to maintain the object reference: an OLE proxy object in the client application, and an OLE stub object in the server application. An OLE channel is also created that connects the OLE proxy and stub objects. To the client, the OLE proxy object looks and acts just like the real object, because the OLE proxy intercepts and forwards all calls to the real object through the OLE channel to the OLE stub object. The OLE stub object in turn calls the real object. The communication between the OLE proxy and OLE stub is managed by an OLE channel object, which sends information between the client and server processes.

There are several problems associated with the existing OLE proxy/OLE channel/OLE stub model to maintain an object reference for client/server object applications that do not share memory. The OLE channel is not capable of sending information between client and server processes on different computers. In a distributed computing environment, client and server applications are typically located on different computers; therefore a client application cannot contain an object reference to a server application running on a remote computer. There is also no way to maintain object identity if an object reference was passed from a client object application to a remote server object application on a remote computer since object references are not known outside the local computer. This limits the ability of software developers to write distributed object applications using existing OLE and other object oriented frameworks.

The OLE proxy/OLE channel/OLE stub model also limits the ability of developers to create anything more than traditional two-tier client/server applications. If a client application could contain references to more than one remote server application (i.e., on one or more remote computers), then three-tier, four-tier, and potentially N-tier client/server layering could be accomplished. Three-tier client/server object layering is desirable for many business applications (e.g., a first tier providing user services, a remote second tier providing business services, and a remote third tier providing data services).

The inability to reference a remote object also limits the scope of a network client object application (e.g., an Internet object application), as only objects on the same computer can currently be referenced. The ability to reference a remote object (e.g., from a hypertext markup language (HTML) file, or in a HTML universal resource locator (URL)) would greatly enhance the variety and format of information (i.e. including audio, video, etc.) that could be accessed by a client network object application.

In accordance with the present invention, the ability to reference remote server object oriented applications on remote computers is achieved. The present invention provides a method for remote automation of object oriented applications. The remote automation method includes providing a two-way communications path between a client object oriented application on a client computer and one or more server object oriented applications residing on one or more remote computers, where the two-way communications path includes an object linking and embedding channel. The object linking and embedding channel allows object linking and embedding information (e.g., OLE information) to be sent to a remote computer. An object reference that is uniquely represented and identifiable by both the client object oriented application and the multiple server object oriented applications is accepted from the client object oriented application. The accepted object reference is passed over the two-way communications path using the object linking and embedding channel to the remote server object oriented application. The object linking and embedding channel allows object linking and embedding information to be sent to a remote computer with the minimum data manipulation or conversion. The remote object is returned to the client object oriented application from a selected server object oriented application.

Using the remote automation method, a client object oriented application can reference remote objects and remote object data on server object oriented applications running on one or more remote computers, provided the client and server computers are connected by a compatible computer network. The remote automation method provides multiple network connection possibilities including TCP/IP, PPP, and SLIP to connect the client and server computers.

The remote automation method is used to extend the OLE object creation process and modify OLE object data. Since only OLE object data is modified, the remote automation method is compatible with existing and previously written OLE client and server object oriented applications, and can be used without modifying these existing applications. In addition, the remote automation method maintains the identity of an object as an object reference is passed to one or more remote computers using the remote automation method.

With the remote automation method, an N-tiered client/server object application model is possible. In addition, object references to remote objects can now be added to network object applications (e.g., in HTML or HTML URLs), greatly enhancing the variety and format of information available to network object applications.

The remote automation method allows developers to quickly and cleanly create distributed client/server object applications, using a known and familiar object oriented programming environment (i.e., OLE), which decreases development time, and lowers overall development costs.

The foregoing and other features and advantages of the present invention will be more readily apparent from the following detailed description, which proceeds with reference to the accompanying drawings.

BRIEF DESCRIPTION OF THE DRAWINGS

FIG. 9 is a flow chart illustrating N-tier layering for one embodiment of the present invention.

DETAILED DESCRIPTION OF PREFERRED EMBODIMENT

Figure 1:
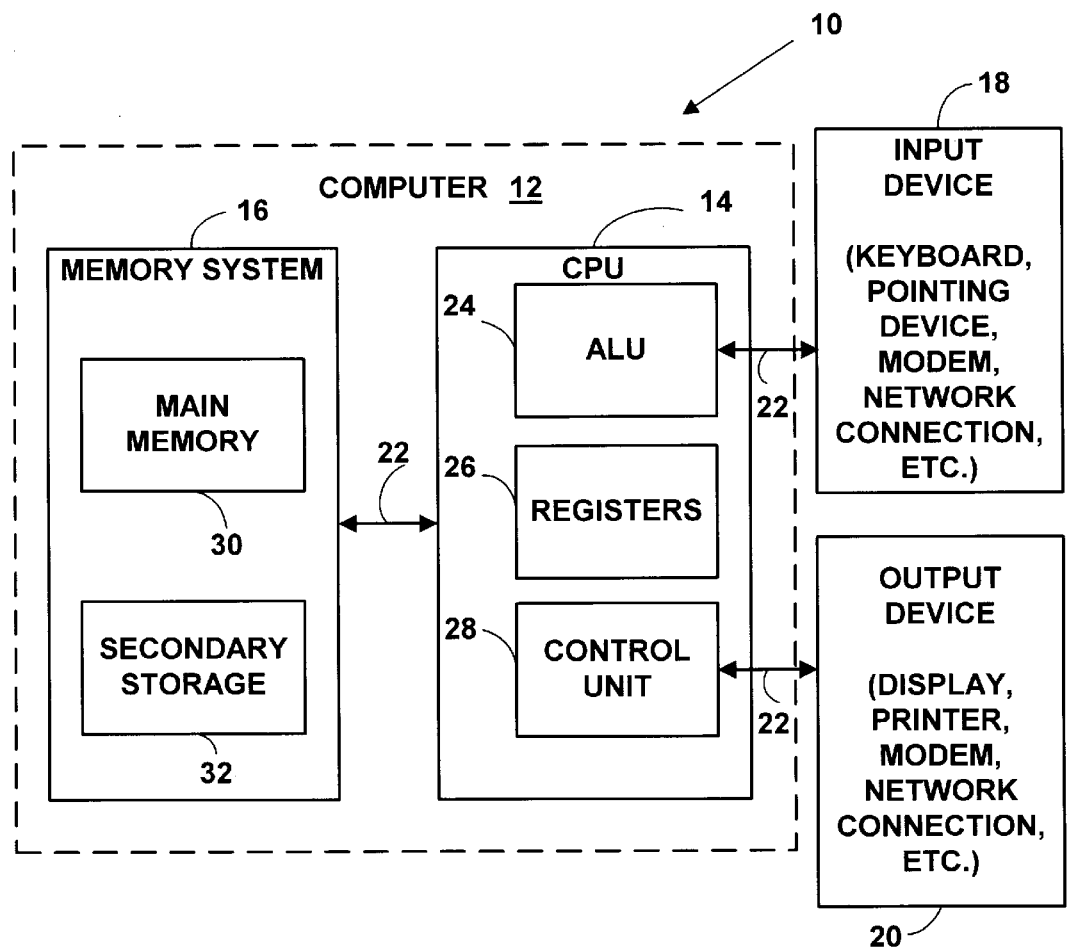
FIG. 1 is a block diagram of a computer system used to implement a preferred embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g. a microphone, etc.), or any other device providing input to the computer system 10. The output device 20 can comprise a display, a printer, an audio device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

In a preferred embodiment of the present invention, the computer system 10 preferably uses the Windows® 95 client/server operating system. However, other client/server operating systems (e.g. Windows NT™, OS/2®, by IBM, etc.) could also be used. A client/server operating system is an operating system which is divided into a plurality of processes of two different types: server processes, each of which typically implements a single set of services, and client processes, which request a variety of services from the server processes. Object oriented programming is used to design the client/server operating system, where objects represent system resources.

For example, the Windows®95 client/server operating system provides shareable resources, such as files, memory, processes and threads, which are implemented as "objects" and are accessed by using "object services." As is well known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e. sometimes known as an object method) defined in the object's class, and a data block, containing the current values for each object variable (i.e., data members, sometimes known as an object property). An application has some reference to an object through an object pointer. An application obtains this object reference by using some type of function call (direct or implied) in which that function allocates an object block in computer memory, initializes the function table, and returns the reference to the computer memory to an application. The computer memory may be local or distributed on a remote computer.

The Windows® 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

In one embodiment of the present invention, processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The Component Object Model (COM) is a model used for object oriented programming. The COM specifies how objects within a single application or between applications (e.g. client/server applications) interact and communicate by defining a set of standard interfaces. Interfaces are groupings of semantically related functions through which a client application accesses the services of a server application.

Object Linking and Embedding (OLE), such as OLE Version 2 by the Microsoft Corporation of Redmond, Wash., is based in part on the Component Object Model and allows the creation of objects of different formats which operate on data through defined interfaces, rather than operating on the applications responsible for the data. The object data can be embedded within an object, or linked to it, so that only a link reference to the data is stored in the object.

Figure 2:
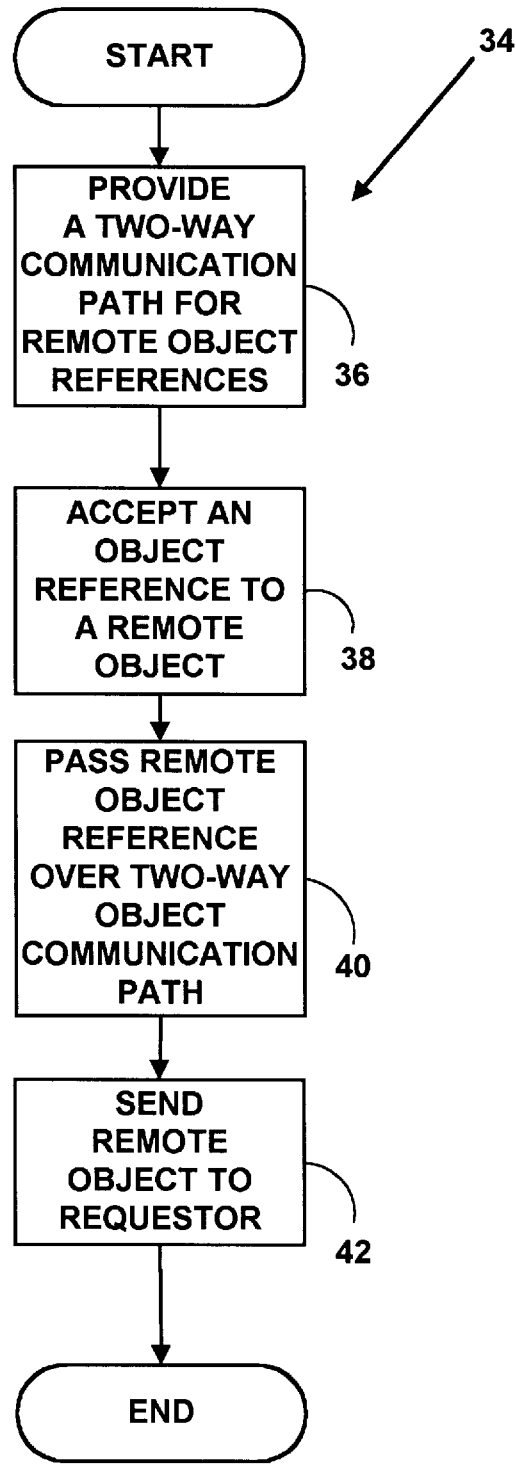
FIG. 2 is a flow diagram of a method for one embodiment of the present invention.

FIG. 2 shows a method 34 for remote automation of object oriented applications according to a preferred embodiment of the present invention. Method 34 allows a client object oriented application to make remote object references, such as object linking and embedded references, to multiple server object oriented applications over a two-way communications path, where the two-way communications path includes an object linking and embedding channel. The remote object references are used to obtain remote object and remote object data.

As is shown in FIG. 2, the remote automation method 34 includes providing a two-way communications path between a client object oriented application on a client computer and one or more server object oriented applications residing on one or more remote computers 36, where the two-way communications path includes an object linking and embedding channel. A remote object reference that is uniquely represented and identifiable by both the client object oriented application and the multiple server object oriented applications is accepted from the client object oriented application 38. The accepted remote object reference is passed over the two-way communications path using the object linking and embedding channel to the server object oriented application 40. The remote object is returned to the client object oriented application from the server object oriented application over the object linking and embedding channel 42.

Figure 3:
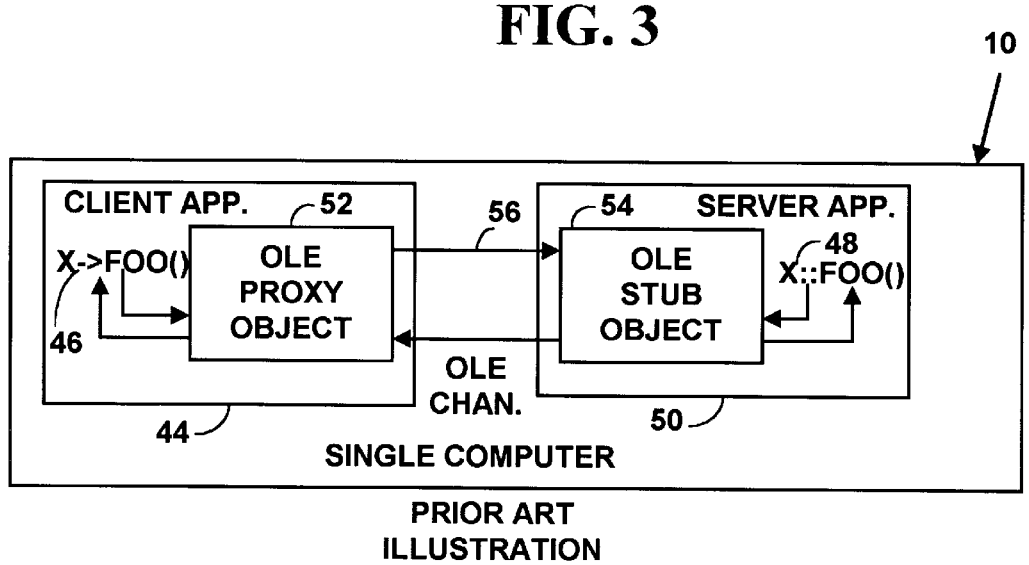
FIG. 3 is a block diagram illustrating the existing OLE object oriented communication between a client and server object oriented application on the same computer.

As is shown in FIG. 3, the existing OLE object system provides the ability for a client object oriented application 44 (hereinafter client application) to have a reference 46 to an object 48 in a server object oriented application 50 (hereinafter server application) executing on the same computer 10, even though the two applications are not sharing process memory. In many client/server operating systems, client and server applications are confined to a single operating system process which allows the client and server application to communicate using shared process memory. In Windows® 95 by Microsoft, and other client/server operating systems, client and server applications are created in separate processes, which typically do not share the same memory space, or use shared memory to communicate.

To allow out-of-shared memory references, two additional objects are created by OLE to maintain the object reference: an OLE proxy object 52 in the client application 44, and an OLE stub object 54 in the server application 50. An OLE channel 56 is also created which connects the OLE proxy and stub objects (52, 54).

When the object reference X→FOO( ) 46 is made on the client application 44, the OLE proxy object 52 is treated internally just like the real object X::FOO( ) 48, because the OLE proxy object 52 intercepts and forwards all calls to the real object through the OLE channel 56 to the OLE stub object 54. The OLE stub object 54 in turn calls the real object 48. The communication between the proxy and stub is managed by an OLE channel object 56, which understands how to send object information between the client 44 and server 50 applications. The OLE object reference support just described is typically used from a high level object oriented programming language. For example, the Visual Basic® programming language by Microsoft provides the support for the OLE client/server proxy/stub object reference scheme described above.

The OLE proxy/stub object reference scheme only works for client and server application executing on the same computer, which is a severe limitation. In a distributed computing environment, it is typical to have a client application executing on one computer and server application executing on another, remote computer.

In one embodiment of the present invention, the OLE environment is modified and enhanced to allow object references to objects on remote computers. An object oriented application called Remote Automation (RA) is provided that works as an extension of, and in conjunction, with OLE. The Remote Automation object oriented application uses the remote automation method 34 to allow a server object oriented application to make a remote object reference to a remote object or remote object data on a server object oriented application.

The Remote Automation application extends the OLE object creation process by modifying the system registry data on the client computer. Since only OLE data is modified, Remote Automation is compatible with existing OLE automation client/server applications. Existing OLE applications do not have to be changed or recompiled using Remote Automation. On each host client/server operating system, preferably the operating system registry (also called the registration database) is used to store relevant information about object components according to their CLass IDentifier (CLSID). An object registers its CLSID in the operating system registry to enable client applications to locate and load the executable code associated with the objects.

The CLSIDs are given the alias "GUID," which stands for Globally Unique IDentifiers. Each object class is represented by a GUID, a 128-bit (16-byte) number that is assumed to be unique in the world across space and time. A GUID is a 16-byte value with a specific structural definition that has an ASCII representation shown below as a group of hexadecimal digits within braces such as "{42754850-16b7-11ce-90eb-00aa003d7352}" (The groupings of the hex digits and the hyphens are part of the ASCII representation as well). The structural definition of a GUID is manipulated by applications programs such as the Remote Automation object oriented application.

The structural definition in C/C++ programming syntax of a GUID for the Windows® 95 operating is included in the Windows header file "wtypes.h" is shown below.

```
typedef struct _GUID
{
  DWORD Data1;
  WORD Data2;
  WORD Data3;
  BYTE Data4[8];
} GUID;
``` where "DWORD Data1" is a double word sized variable "Data1", "WORD Data2" and "WORD Data3" are single word sized variables, and "BYTE Data4[8]" is an array of eight one-byte (8-bit)variables.

When a client application 44 asks OLE to create an object, OLE must first determine which server application to run. This information is stored in the operating system registry (e.g., Windows®95 registry) for each object class, and each object class is represented by a unique GUID. Most of the OLE object application information is stored in subkeys under the CLSID root key. For example, in Windows®95, the operating system registry may appear as follows:

CLSID //root key
   {42754850-16b7-11ce-90eb-00aa003d7352} //GUID subkey
      LocalServer32=myserver.exe//local (same machine) server;

where "{42754850-16b7-11ce-90eb-00aa003d7352}" is the ASCII representation of the GUID for the object class, and "LocalServer32" represents the registry sub-key name of the local server executable (e.g., myserver.exe) for the object class represented by the GUID.

In order for Remote Automation to function, the Remote Automation application is invoked during the OLE object creation process. This is done by modifying the registry data in the operating system registry so that OLE still loads a server application, but it is in fact loading a Remote Automation Proxy application which will communicate with the server application. The "LocalServer32" registry sub-key is replaced with a sub-key that tells OLE to load the Remote Automation proxy. For example, the modified operating system registry may appear as follows after modification by Remote Automation:

CLSID //root key
   {42754850-16b7-11ce-90eb-00aa003d7352} //GUID subkey
      InProcServer32=autprx32.dll//local (same machine) proxy;

where "{42754850-16b7-11ce-90eb-00aa003d7352}" is the ASCII GUID for the class, and "InProcServer32" represent the name of the registry sub-key of the executable proxy for the object class represented by the GUID. However, in this example, the executable application is in autprx32.dll (i.e., AUTomation PRoXy Dynamic Link Library (DLL)). Dynamic link libraries, as is known in the art, provide functions that application programs link to and call as regular procedure calls. The "InProcServer32" keyword is used instead of the "LocalServer32" keyword since the Remote Automation proxy application (in autprx32.dll) is an in-process object (i.e., operates within the same process as the client object application), while myserver.exe is an out-of-process object application (i.e., operates within a process different from the client object application). The in-process Remote Automation proxy application will communicate with a remote server application.

As long as the Remote Automation proxy object created by autprx32.dll forwards all requests to the real object in myserver.exe running on the remote computer, it does not matter that the real object does not exist on the same computer as the client object application which made the object reference.

When creating the real object, the Remote Automation application must be able to identify which remote computer to ask to create the real object. As a result, the Remote Automation application adds additional sub-keys to specify the network location (address) and the network protocol to be used to find and connect to the remote computer. For example, the modified operating system registry may now appear as follows:

CLSID //root key
   {42754850-16b7-11ce-90eb-00aa003d7352} //GUID subkey
      InProcServer32=autprx32.dll//local (same machine) proxy;
      NetworkAddress=1.24.128.36 //remote IP address ProtocolSequence=ncanc_ip_tcp//tcp/ip connect protocol where the "NetworkAddress" sub-key in this example which specifies an IP address (e.g., 1.24.128.36) of a remote computer, and the "ProtocolSequence" specifies TCP/IP as the protocol that should be used to connect to the remote computer. However, any number of different network address formats and connection protocols could also be specified in the NetworkAddress and ProtocolSequence sub-keys.

Figure 4:
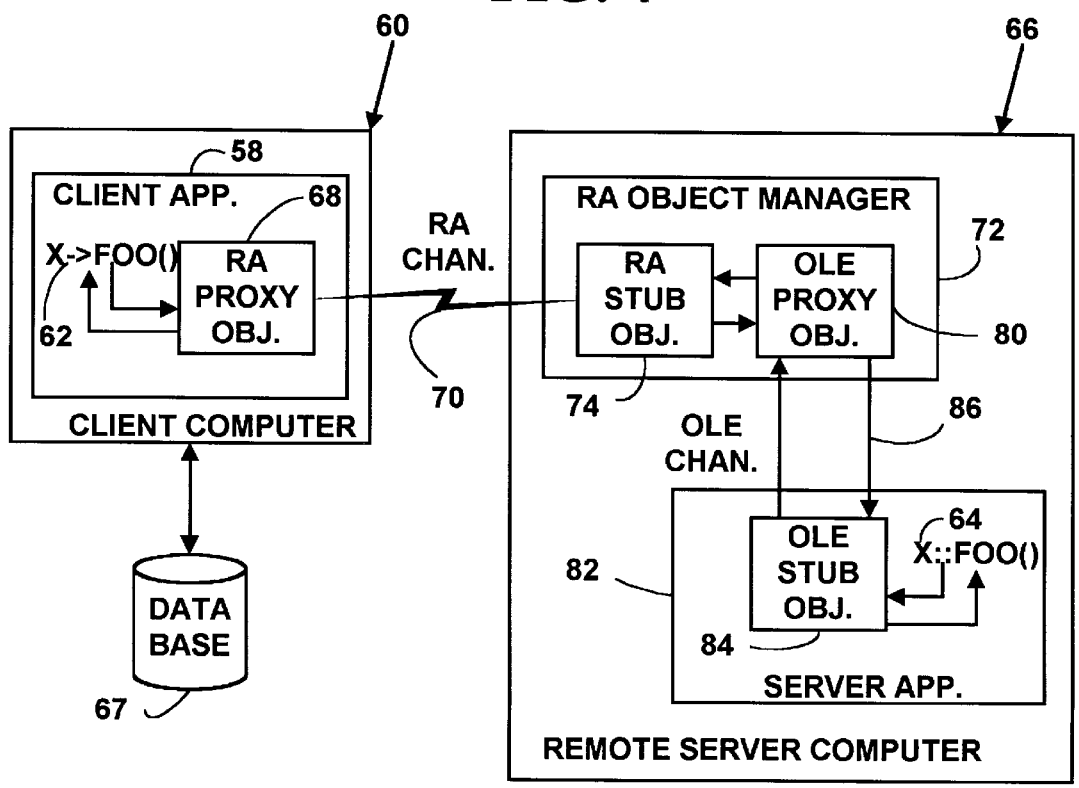
FIG. 4 is a block diagram illustrating remote OLE object oriented communications between a client object oriented application and a remote server object oriented application on a remote computer.
Figure 8:
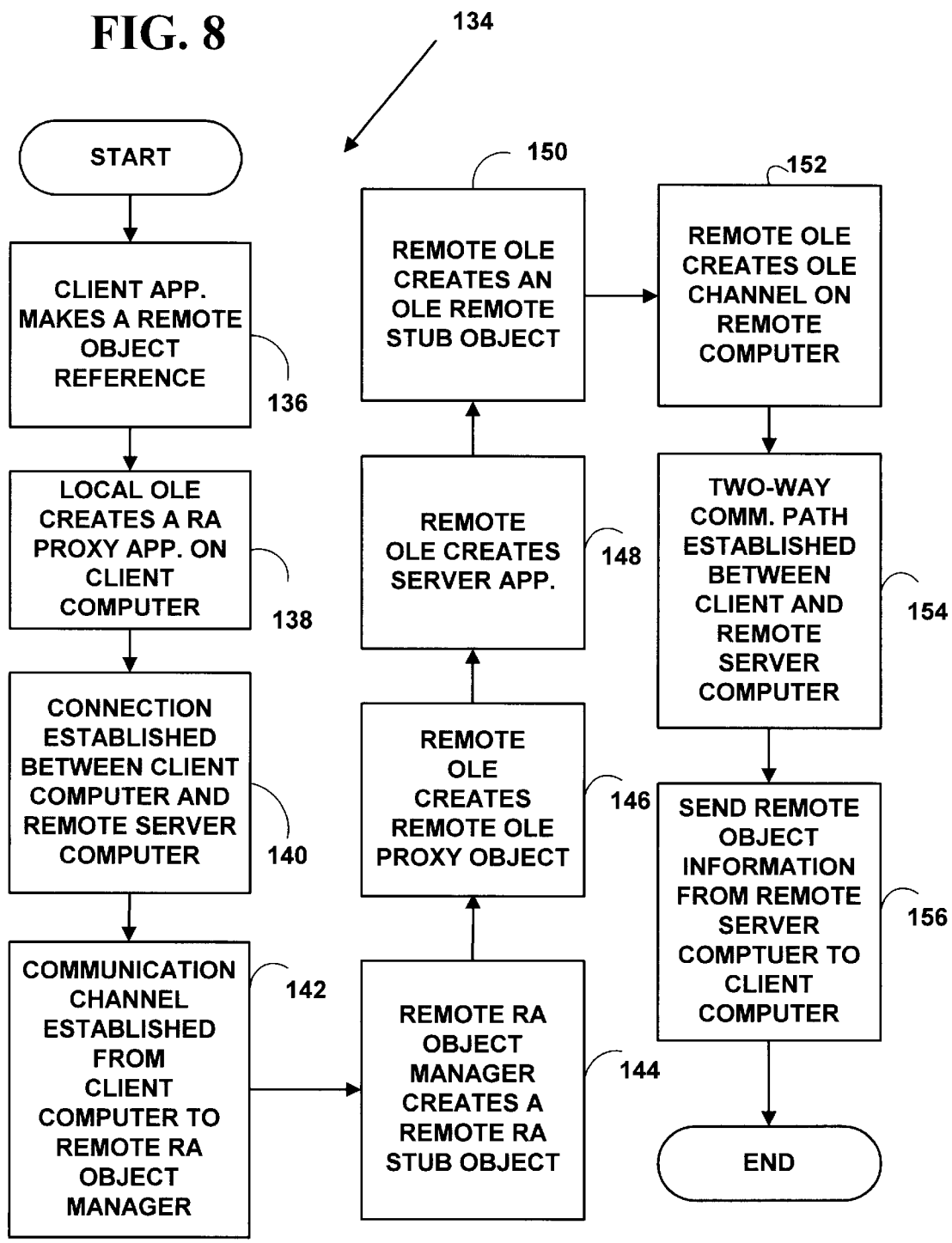
FIG. 8 is flow chart illustrating a method for one embodiment of the present invention.

As is shown in FIG. 4, and is illustrated by method 134 in the flow chart in FIG. 8, a client object oriented application 58 on a client computer 60 makes a remote reference X→FOO( ) 62 (process block 136) to a remote object X::FOO( )64 which resides on a remote server computer 66, and OLE on the client computer 60 (i.e., local OLE) consults the modified operating system registry 67 to determine which server application to run.

Using the modified operating system registry shown below, and assuming the ASCII GUID for the object class X::FOO( ) is {42754850-16b7-11ce-90eb-00aa003d7352}, local OLE finds this entry in the modified operating system registry, and invokes autprx32.dll to create a RA proxy object application 68 (hereinafter RA proxy) on the client computer 60 (process block 138).

CLSID //root key
{42754850-16b7-11ce-90eb-00aa003d7352} //GUID subkey
InProcServer32=autprx32.dll//local (same machine) proxy;
NetworkAddress=1.24.128.36 //remote IP address
ProtocolSequence=ncanc_ip_tcp//tcp/ip connect protocol In addition, local OLE will use "1.24.128.36" as the network address of the remote computer 66 and TCP/IP as the network protocol to connect to the remote computer. The Remote Procedure Call (RPC) facility is used to connect to the remote computer 66. However, other facilities could also be used to connect the client computer 60 to a remote server computer 66.

Windows® 95 and Windows NT™ provide RPC functionality via a RPC channel object that encapsulates all the details about the underlying cross-process and cross-network transport. The RPC channel object uses a generic RPC transport provider interface to talk to a remote transport protocol. The RPC provider interface acts as thin layer between the RPC facility and the network transport, mapping RPC operations onto the functions provided by the network transport. The RPC facility implements transport providers (e.g., DLLs) for named pipes, NetBIOS, TCP/IP, DECnet, and others. Additional transports can be supported by writing new provider DLLs that plug into the RPC channel object.

Returning to FIG. 4, a connection is made to the remote computer using the Remote Procedure Call (RPC) facility, to create an RPC channel (process block 140), which is called a Remote Automation (RA) channel 70. The RA Channel 70 connects the RA proxy 68 with a Remote Automation Object Manager 72 running on the remote server computer 66. The RA Object Manager 72 is an object oriented application that is invoked by any client/server operating system supporting Remote Automation. The RA Object Manager 72 is capable of accepting a RPC channel connection from a remote computer, and spawning the necessary RA object oriented applications to support remote object references.

The RA Object Manager 72 can be thought of as the agent or daemon equivalent in other distributed object systems such as ObjectBroker, by Digital Equipment Corporation, Orbix, by Iona Corporation, or Portable Distributed Objects, by NeXT Corporation. In these distributed systems (i.e., Digital's, Iona's, NeXT's), the agent resides on the server platform and serves to connect client requests to an appropriate server implementation and to return an object reference to the requesting client. The RA Object Manger 72 performs the same service for requesting Remote Automation clients. However, the RA Object Manager 72 does not provide the Common Object Request Broker Architecture (COBRA) based Object Request Brokers, as the ObjectBroker, Orbix or NeXT products do.

Figure 5:
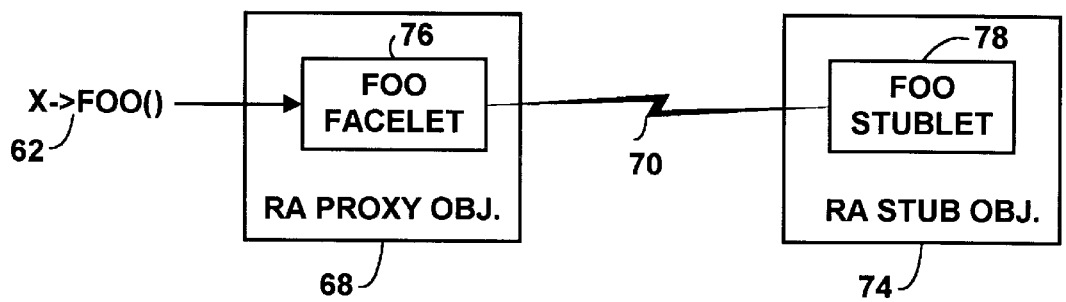
FIG. 5 is a block diagram illustrating the facelet/stublet interaction between a proxy and remote stub.

Once the RA channel 70 has been established to the RA Object Manager 72 (process block 142) the RA proxy 68 requests the RA Object Manger create a RA remote stub object oriented application 74 (hereinafter RA remote stub) (process block 144). As is shown in FIG. 5, The RA proxy 68 manages a facelet 76 for each object interface (e.g., there would be a facelet for the object interface to object FOO). The RA remote stub 74 manages a stublet 78 for each corresponding facelet managed by the RA proxy object (e.g., one stublet for FOO).

Object references 62 made from the client application go directly to the appropriate facelet 76 in the RA proxy 68, which marshals the reference to the corresponding stublet 78 in the RA remote stub 74 through the RA channel (RPC channel) 70. Marshalling is the ordering and packaging of data in a particular way to suit a particular network link and protocol, such as resolving local references, obtaining a copy of any local data structures that a pointer refers to, byte swapping to conform to another CPU's data format, etc. When the appropriate stublet in the RA remote stub object 74 receives the marshalled reference, the stublet unmarshals the data and reconstructs the original reference. Marshalling is well known and understood by those skilled in the art.

Returning now to FIG. 4, the RA Object Manager 72 is just another client object oriented application, so OLE on the remote server computer 66 (i.e., remote OLE) will create an OLE remote proxy object 80 within the RA Object Manager (process block 146), create the server application 82 (process block 148), an OLE remote stub object 84 within the server application 82 (process block 150), and an OLE channel 86 (process block 152) which connects the OLE proxy object 80 and local stub object 84 (see FIG. 2 and description above). After remote OLE does this creation, there is a two-way path between the client application 58 on the client computer 60, and the server application 82 on the remote server computer 66 (process block 154). Multiple two-way communications paths can be established between a client application on a client computer and a remote server application on a remote computer, or between a client application and multiple remote server applications on one or more remote server computers.

The path is two-way in the sense that a client object oriented application 58 can make a request for a remote object or remote object data and receive the remote object or the remote object data from the server application 82. The client object oriented application 58 can make object requests, and the server object oriented application 82 responds to the requests. In an alternative embodiment of the present invention, the server object oriented application 82 can also make requests from the client object oriented application 58.

The two-way communications path (process block 154) includes an object linking and embedding channel which is used to send object linking and embeding information (e.g., OLE information) to a remote computer, which is not possible with existing versions object linking and embedding software. The object linking and embedding channel allows object linking and embedding information to be sent from a local client computer 60 to a remote server computer 66 with no manipulation of the object linking and embeding data required by the applications and objects shown in FIG. 4. The actual data pathway is transparent for both local and remote OLE. Any data manipulation that may be necessary (e.g., the marshalling and unmarshalling of data described above) to transport object linking and embedding data on the object linking and embedding channel is also transparent to the applications and objects shown in FIG. 4.

Any remote object reference 62 now made from the client application 58 to a remote object 64 from the server application 84 (process block 156), goes to the RA proxy 68 (including the proper facelet marshalling), through the RA channel 70 across the computer network, to the RA remote stub 74 (including the proper stublet unmarshalling), to the OLE remote proxy 80, through the OLE channel 86, to the OLE remote stub 84, and finally to the real object 64 on the remote server application 84. Local OLE on the client computer 60 is not aware of the actual pathway shown in FIG. 4 to make the object reference. Remote OLE on the remote server computer also is not aware the object reference 62 was made from the client computer 60, or the actual pathway to return the object reference.

In one embodiment of the present invention, an RA proxy/RA remote stub pair is created for each remote object reference. However, a single RA proxy/RA remote stub pair could be created in an alternative embodiment of the present invention to handle all remote object references.

The Remote Automation application ensures that objects are uniquely represented and identifiable when passed from one computer to another by assigning every object a unique GUID when it is created. GUIDs were explained in detail above. The GUIDs generated are stored in a data structure associated with the RA proxy on the client and in a corresponding data structure associated with all RA remote stubs to facilitate lookup by GUID while passing remote object references. Thus, the client and remote server computers all understand and can identify any remote object reference by looking up its GUID in their respective data structures.

Each time a remote object reference is passed to a remote server computer 66, a fast lookup on the object pointer using the stored GUIDs is performed using an operating system thread. This lookup is complicated because each operating system thread may contain a distinct object pointer that references the same remote object. For example, thread A could contain a reference to object B with pointer A1, and thread B could contain a reference to object B with pointer B1.

In one embodiment of the present invention, a common operating system thread called a "reference thread" is established to resolve all references to remote objects on the remote server computer. Every remote object reference 46 sent to the remote server computer 66 is passed to the common reference thread which determines the location of the real object 64, the OLE remote proxy object 80, and the RA stub object 74 (the location of the OLE remote stub object 80 and OLE remote channel 86 are determined from the location of the OLE remote proxy object 80). The common reference thread eliminates the complicated object lookup described above from multiple reference threads thereby increasing the speed and efficiency of Remote Automation. The common reference thread can also be used to resolve object references for local OLE automation (FIG. 3).

Security for object information passed over the object linking and embedding channel connecting a client 60 and remote server computer 66 (i.e., inter-computer channels, including public Internet network channels) is also provided in Remote Automation. Data authentication, data encryption/decryption, and access control are used. However, more or fewer security processes could also be used. One level of data authentication is provided in part by the RPC facility. RPC authentication specifies the level of data integrity guaranteed between the connected computers. As is known in the art, RPC offers seven levels of authentication, ranging from "network default" to "packet privacy," which includes data encryption for any data sent. Other data encryption/decryption techniques could also be used on object reference data before the data was sent to RPC (e.g., encrypted in the RA proxy, and decrypted in the RA remote stub).

Access control allows an administrator to specify which servers remote clients may access. Access can be controlled down to the object class level. Remote Automation offers four levels of access control: CreateNone, CreateAll, CreateIfKey, CreateIfAcl. CreateNone does not allow any objects to be created, CreateAll allows any object to be created, CreateIfKey allows an object to be created if the appropriate registry key is set, and CreateIfAcl allows object creation only if an access control list for the class includes the client user.

Another level of security is also provided in the OLE environment (e.g., on the local OLE channel that is the intra-computer OLE channels) via object oriented data abstractions. Data access is restricted to an explicitly declared list of functions in an object class public interface. The protection of private object data (e.g., OLE channel data) relies on the object oriented restriction on the use of public class member names.

In one embodiment of the present invention, the Remote Automation application is available in Visual Basic® 4.0, Enterprise Edition, by Microsoft Corporation. A developer familiar with creating client/server applications in Visual Basic® which can execute on a single computer can now easily create distributed client/server applications using Remote Automation.

However, the Remote Automation application can also be used with other object oriented programming languages such as C++, Visual C++, and others, and is not limited to the Visual Basic® language. Since Remote Automation is external to OLE, and extends OLE, Remote Automation can also be made available as a stand alone external OLE application or an OLE add-on. In addition, the Remote Automation concepts discussed here can also be directly incorporated in the COM or the Distributed Component Object Model (DCOM) (i.e. the component object model for distributed systems), which in turn could be directly incorporated into OLE, instead of existing as an external object oriented application which hooks into OLE.

Remote Automation provides a set of interfaces to extend existing local OLE automation (FIG. 3) for use on distributed systems. Thus, Remote Automation inherits local OLE automation data limitations (e.g., local OLE automation cannot send data types such as structures through an OLE automation channel). However, in an alternative embodiment of the present invention where Remote Automation is created as a stand-alone object oriented application which includes modifying the existing local OLE automation process (FIG. 3), the local OLE automation data limitations are overcome (e.g., data types such as structures can be sent through an OLE channel).

Remote Automation also provides the necessary building blocks for the deployment of N-tiered client/server applications as is shown by method 160 in FIG. 9. An N-tiered services model, for any type of client/server services, can be developed using Remote Automation. For example, a three-tiered client/server architecture is ideal for business applications. The three-tiered architecture provides the ability to support a conceptual layer of business logic between the traditional two-tier components of the client user interface and a server database. The business logic layer can be maintained separately (e.g., on a separate computer) from the data, which is not possible in the two-tiered client/server environment known in the art.

Figure 6:
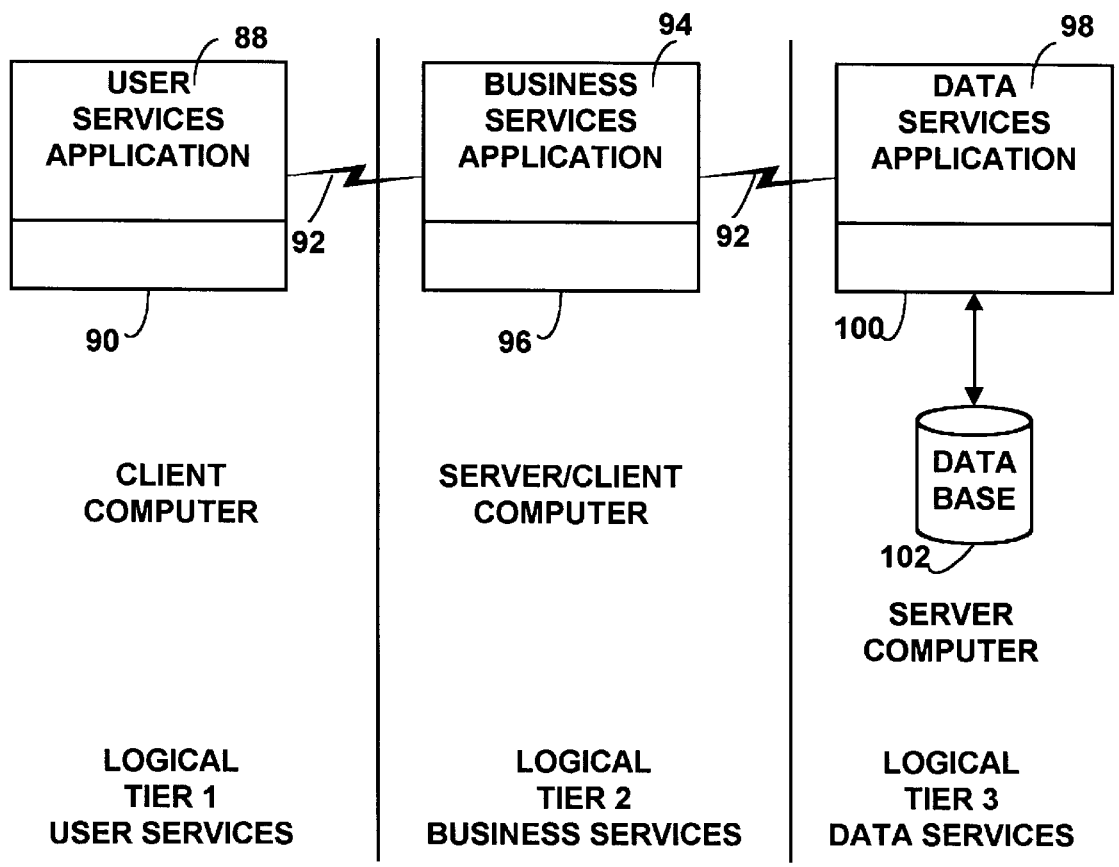
FIG. 6 is a block diagram illustrating one example of a logical three-tiered services model.

As is shown in FIG. 6, a logical three-tiered business architecture includes a user services application 88 providing a user interface and user interface navigation, that exists as a client application on a client computer 90. The user services application uses Remote Automation 92 (FIGS. 3 and 4) to communicate with a server business services application 94 on a remote second computer 96. The business services application 94 provides business policies/rules and generation of business information from data. The server business services application 94, now acting as a client application, uses Remote Automation 92 to communicate with a server data services application 98 on a third remote computer 100. The data services application has access to a database 102, and handles data definition, storage and retrieval of data requested by the business services application. In the two-tiered client/server model known in the art, the business services application 94 and the data services application 98 would typically exist on the same server computer, and consist of a complex set of object oriented applications. This complex set of object oriented applications reside on the same computer in the traditional two-tier client/server environment since remote object references are not available.

Figure 7A:
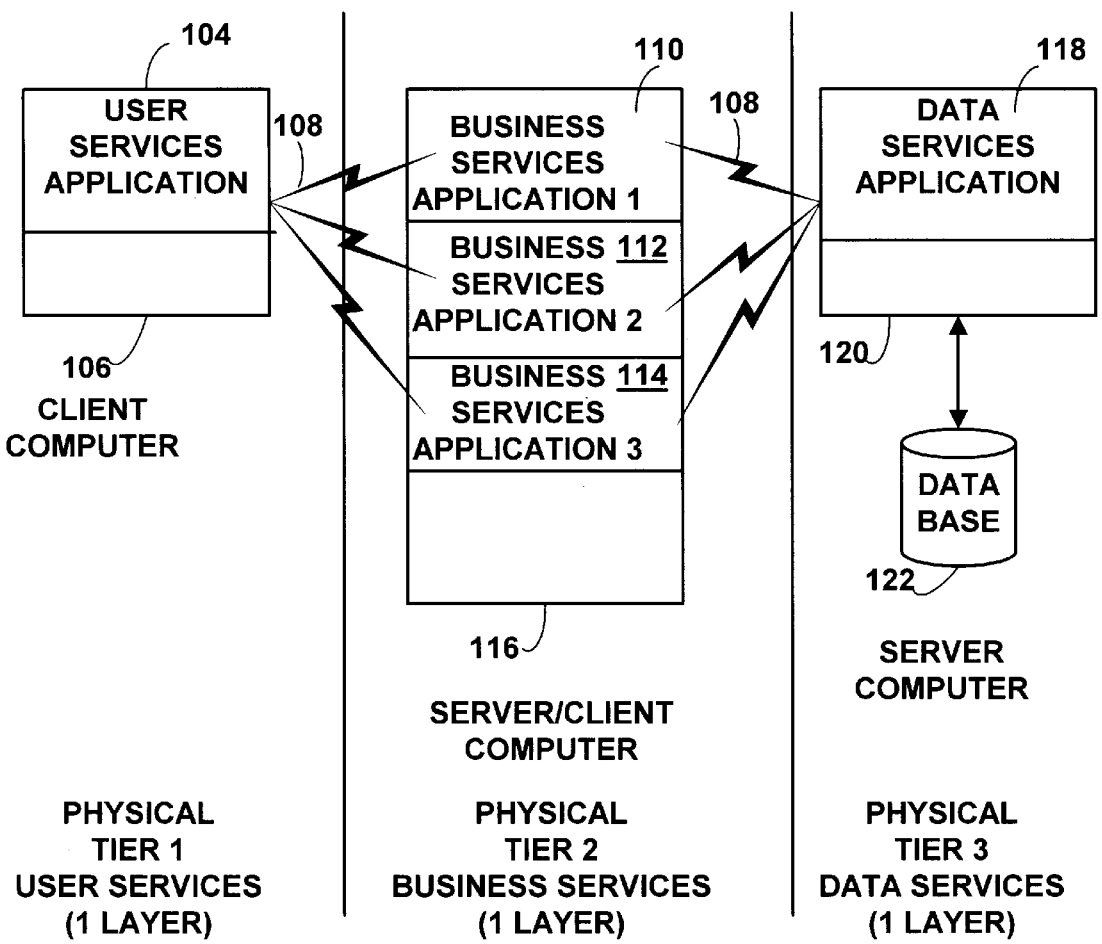
FIG. 7A is a block diagram illustrating one physical embodiment of the logical three-tiered services model shown in FIG. 6.

Remote Automation permits a physical N-layered business architecture to be developed independently from the logical three-tier business architecture (process block 162) shown in FIG. 6. For example, as is shown in FIG. 7A, a user services application 104 on a client computer 106 uses Remote Automation 108 to communicate with several different server business services applications (110–114) on a remote second computer 116. Each different business services application provides a specific business functionality (e.g., one provides an account balance, two provides a record of sales, three provides a record of payments, etc.). Each of the different server business services applications, acting as client applications, uses Remote Automation 108 to communicate with a data services application 118 on a remote third server computer 120. The remote third computer is coupled to a database 122. FIG. 7A shows a physical model with one layer in each of the three logical tiers corresponding to the three-tiered logical model shown in FIG. 6.

Figure 7B:
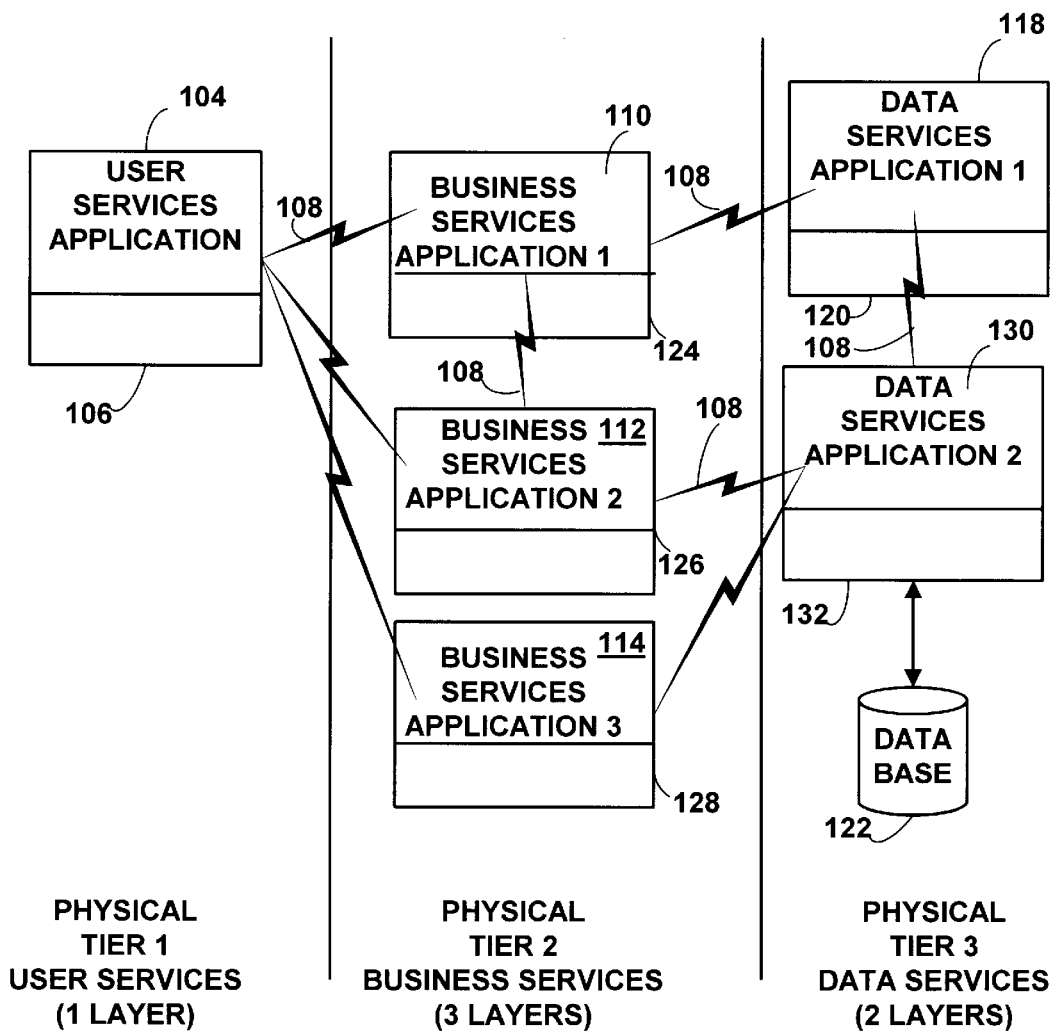
FIG. 7B is a block diagram illustrating a second physical embodiment of the logical three-tiered services model shown in FIG. 6.

The business applications (110–114) may also exist on multiple remote business computers (124–128) as is shown in FIG. 7B. There may also be multiple data services applications (118,130) on multiple remote data computers (120,132) connected via Remote Automation in a variety of configurations.

Remote Automation enables the physical performance and administration needs of a computer system (i.e., physical layering) to be fully addressed by allowing application objects to be located on one or more remote computers as needs dictate (process block 164), without having to give up the code partitioning benefits of the logical model. For example, if a user interface application called several business services applications residing on one remote computer (e.g., FIG. 7A), and the performance of the one remote computer became unacceptable (process block 166), one or more of the business services applications could be moved to one or more additional remote computers (e.g., FIG. 7B) to improve performance (process block 168). A similar scenario could be employed for the data services applications (e.g., FIG. 7B) including adding additional computers/databases to the physical layout. The physical layering could be changed a number of times (process blocks 166,168) without changing the logical model.

Changing the physical layering (e.g., FIG. 7B) has no effect on the logical concepts developed for the three-tiered (or N-tiered) logical model (e.g., FIG. 6). For example, FIG. 7B illustrates a six layer physical model to provide functionality for the three-tiered logical model shown in FIG. 6 (i.e., one physical layer for logical tier one (user services), three physical layers for logical tier two (business services), and two physical layers for logical tier three (data services)).

Remote Automation provides the ability to quickly and easily change and configure a physical model without affecting the original logical model. Any remote object references made by a client object oriented application are uniquely represented, and known to all server object oriented applications, no matter how many physical layers are used to represent a logical model.

Business applications on the remote business services computer would use Remote Automation to move some of the business service applications to one or more additional remote computers. The move would be invisible to the user services interface application. When the user services interface application made a reference to a business services application that was moved to a remote computer, the reference would be passed to the proper place using Remote Automation. The remote computer would know and understand the reference passed to it. Thus, Remote Automation provides substantial "invisible" physical flexibility once an N-tiered logical services model has been developed. The N-tiered logical model made possible by Remote Automation is not limited to business services, but may be used to design a wide variety of other applications, requiring N-tiered layering.

Remote Automation is also used to provide the ability to reference remote objects from a client network object oriented application (e.g., an Internet client network application). Remote Automation provides the ability to reference a remote object from a HyperText Markup Language (HTML) file. HTML is one of the standards for defining Internet network documents. An object reference can now be added to an HTML file to provide additional capabilities (e.g., multi-media capabilities) for HTML applications which formerly could only reference objects on the same computer.

A Remote Automation object reference can also be used with, as, or within a Universal Resources Locator (URL) in a HTML file. A URL is a standard way specifying a site or page on a network (e.g., the Internet or world wide web). For example, a HTML reference to a remote object may be:

<OBJECT ID=MyObj "CLASSID=clsid:SF6E4ELO-9C38-11CF-B63C-0080C792B782"> where "OBJECT ID=MyObj" is the name of an OLE object (e.g., MyObj) and "CLASSID=clsid:SF6E4ELO-9C38-11CF-B63C-0080C792B782" is the name and the ASCII GUID value of the remote object.

Since hypertext transfer protocol (HTTP) and other protocols used with URLs for the Internet and other computer networks typically do not provide any state information or object type checking, Remote Automation is used to provide state information and object type checking for network client object oriented applications which need to access remote object information. Since Remote Automation uses RPC, which provides data authentication, data encryption/decryption and access control, Remote Automation also provides the ability for a network client object oriented application to use a secure, two-way communications path to complete a remote object reference without building in additional security features.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention. Rather, we claim as our invention all such embodiments as come within the scope and spirit of the following claims and equivalents thereto.

We therefore claim as our invention all that comes within the scope and spirit of the following claims:

We claim:

1. A computing method for sending object information comprising:

providing a two-way communications path between a client object oriented application and a plurality of server object oriented applications residing on a plurality of remote computers, the two-way communications path including an object linking and embedding channel;

accepting an object reference from the client object oriented application to a remote object, wherein the remote object reference is uniquely represented and identifiable by both the client object oriented application and the plurality of server object oriented applications;

passing the accepted remote object reference over the provided two-way communications path to a selected server object oriented application; and sending the remote object to the client object oriented application from the selected server object oriented application.

2. The method of claim 1 where the object reference is an object linking and embedding reference.

3. The method of claim 1 where said two-way communications path is a secure communications path providing security features including access control, data authentication, and data encryption/decryption.

4. A computer readable medium having stored therein instructions capable of causing a computer to perform the method of claim 1.

5. A computing system for providing three-tiered services, the system comprising:

a client application on a first computer;

a first remote server application on a second remote computer;

a second remote server application on third remote computer;

a first two-way communications channel between the client application and the first remote server application, said first two-way communications channel including an object linking and embedding channel;

a second two-way communications channel between the first remote server application and second remote server application, said second two-way communications channel including an object linking and embedding channel; and a two-way communications path between the client application and the first and second remote server applications including said first and second two-way communications channels.

6. The system of claim 5 for providing three-tiered services where the client application is an application including a user interface, the first remote server application is an application including policies/rules and the generation of information from data, and the second remote server application is an application including data definition, data storage, and data retrieval.

7. In a computing method for sending object information that includes executing a client application on a first computer, said client application requesting a service from a first server application executing on a first remote computer, an improvement comprising:

inserting a plurality of second remote computers between said first computer and said first remote computer, said plurality of second remote computers executing a plurality of second remote server applications;

providing a two-way communications path between the client application and the first remote server application through said plurality of second remote server applications, the two-way communications path including an object linking and embedding channel;

said request for service from the client application being uniquely represented and understood by the client application, the first remote server application, and the plurality of second remote server applications;

passing said request for service from the client application, through the plurality of second remote server applications, to the first remote server application using said two-way communications path.

8. The method of claim 7 where the request for service is a request for service from a remote object.

9. The method of claim 7 where the request for service is an object linking and embedding service request.

10. A computing method for sending object information comprising:

providing a two-way communications path between a network client object oriented application and a plurality of network server object oriented applications residing on a plurality of remote computers, the two-way communications path including an object linking and embedding channel;

accepting an object reference to a remote object from hypertext markup language data on the network client object oriented application, where the object reference is uniquely represented and identifiable by the network client object oriented application and the plurality of network server object oriented applications; and passing the accepted remote object reference over the provided two-way communications path to a selected server object oriented application; and sending the remote object to the client object oriented application from the selected server object oriented application.

11. The method of claim 10 where said object reference is included in a universal resource locator within said hypertext markup language data.

12. The method of claim 10 where the object reference is an object linking and embedding reference.

13. The method of claim 10 where said two-way communications path is a secure communications path, providing security features including access control, data authentication, and data encryption/decryption.

14. A computer readable medium having stored therein instructions capable of causing a computer to perform the method of claim 10.

15. A computer system including a first computer and a remote second computer, each computer having a central processing unit coupled to a memory, and a client/server operating system, a method of maintaining object reference identity when an object reference is passed between the first and remote second computers, the method comprising:

modifying a registry database maintained on the first computer, the modifications including instructions for communicating with a remote server object oriented application residing on the second remote computer;

making a reference from a client object oriented application running on the first computer to the remote server object oriented application;

upon detection of said reference, using the instructions from said modified database registry to initiate on the first computer a proxy object oriented application, and establish a first two-way communications channel between said proxy object oriented application and a remote automation object manager running on the remote second computer;

requesting said remote automation object manager to initiate a remote stub object oriented application;

requesting said remote stub object oriented application to initiate a remote proxy object oriented application;

requesting said remote proxy object oriented application initiate a remote server stub object oriented application;

requesting said remote proxy object oriented application to establish a second two-way communications channel between said remote proxy object oriented application and said remote server stub object oriented application;

establishing a two-way communications path between the client object oriented application and the remote server object oriented application using said proxy, remote stub, remote proxy, and remote server stub object oriented applications and said first and second two-way communications channels; and passing said reference from the client object oriented application on the first computer to the remote server object oriented application on the second computer using said two-way communications path.

16. The method of claim 15 further comprising:

passing said reference from said client object oriented application, to said proxy object oriented application, to said remote stub object oriented application, to said remote proxy object oriented application, to said remote server stub object oriented application, to said remote server object oriented application using said two-way communications path; and maintaining the ability to identify said reference at each of said object oriented applications through which said reference is passed in said two-way communications path.

17. The method of claim 15 where the requesting said remote proxy object oriented application to initiate a remote server stub object oriented application includes requesting the remote proxy object oriented application to initiate the remote server object oriented application, the remote server object oriented application including a remote server stub object oriented application.

18. The method of claim 15 where the two-way communications path includes a two-way object linking and embedding channel.

19. The method of claim 15 where the reference is an object linking and embedding reference.

* * * * *

UNITED STATES PATENT AND TRADEMARK OFFICE
CERTIFICATE OF CORRECTION

PATENT NO. : 5,881,230

DATED : March 9, 1999

INVENTOR(S) : Christensen et al.

It is certified that error appears in the above-identified patent and that said Letters Patent is hereby corrected as shown below:

| Col./line | Error Reads | Should Read |
|---|---|---|
| 3/48 | is flow | is a flow |
| 10/11 | (COBRA) | (CORBA) |
| 10/7, 10/15 | Object Manger | Object Manager |
| 10/17 | The | the |
| 11/49 | A1 | A1 |
| 11/51 | B1 | B1 |
| 14/55 | way specifying | way of specifying |
| 15/62 | on third | on a third |
| 17/34 | application initiate | application to initiate |

Signed and Sealed this

Twelfth Day of December, 2000

Attest:

Q. TODD DICKINSON

*Attesting Officer*   *Director of Patents and Trademarks*